US012676813B2

(12) United States Patent
Dixit et al.

(10) Patent No.: US 12,676,813 B2
(45) Date of Patent: Jul. 7, 2026

(54) SYSTEM AND METHOD FOR REDUCING PERMITTED SESSION DOWNTIME

(71) Applicant: Microsoft Technology Licensing, LLC, Redmond, WA (US)

(72) Inventors: Vaibhav Hemant Dixit, Redmond, WA (US); Saikrishna Arcot, Kirkland, WA (US); Ying Xie, Sammamish, WA (US); Guohan Lu, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 115 days.

(21) Appl. No.: 18/803,227

(22) Filed: Aug. 13, 2024

(65) Prior Publication Data

US 2025/0317497 A1 Oct. 9, 2025

Related U.S. Application Data

(60) Provisional application No. 63/575,322, filed on Apr. 5, 2024.

(51) Int. Cl.
*H04L 45/24* (2022.01)
*H04L 45/28* (2022.01)
*H04L 67/00* (2022.01)
*H04L 41/0659* (2022.01)

(52) U.S. Cl.
CPC ............ *H04L 45/245* (2013.01); *H04L 45/28* (2013.01); *H04L 67/34* (2013.01); *H04L 41/0661* (2023.05)

(58) Field of Classification Search
CPC ........ H04L 45/245; H04L 45/28; H04L 45/44
See application file for complete search history.

(56) References Cited

U.S. PATENT DOCUMENTS

| | | | |
|---|---|---|---|
| 2015/0103644 A1 | 4/2015 | Bharadwaj | |
| 2022/0159108 A1* | 5/2022 | Li | H04L 45/28 |
| 2022/0197683 A1 | 6/2022 | Potlapally | |
| 2025/0317383 A1 | 10/2025 | Dixit | |

OTHER PUBLICATIONS

Cisco Nexus 9000 Series NX-OS Interfaces Configuration Guide, Release 9.3(x), Mar. 28, 2022 (Year: 2022).*
"High Availability for a Link Aggregation Group (LAG) Using Link Aggregation Control Protocol (LACP)", An IP.com Prior Art Database Technical Disclosure, Jan. 22, 2016, 09 Pages.
Non-Final Office Action mailed on Dec. 31, 2025, in U.S. Appl. No. 18/803,190, 11 Pages.

* cited by examiner

*Primary Examiner* — Chirag R Patel
(74) *Attorney, Agent, or Firm* — Foley IP Law, PLLC

(57) ABSTRACT

A method, computer program product, and computing system for reducing communication session downtime includes transmitting first signals at a predetermined time interval of X seconds; upon initiation of a reboot operation of a first device associated with the processor, decreasing the predetermined time interval from X seconds to Y seconds; transmitting the first signals at the time interval of Y seconds; and once the reboot of the driver is complete, increasing the predetermined time interval from Y seconds to X seconds.

21 Claims, 8 Drawing Sheets

200

400

| Description | | Length (in bytes) |
|---|---|---|
| LACP Version = 0x01 | | 1 |
| TLV Type (Actor Information) = 0x01 | | 1 |
| TLV Length = 20 | | 1 |
| TLV Data | Actor System Priority | 2 |
| | Actor System ID | 6 |
| | Actor Key | 2 |
| | Actor Port Priority | 2 |
| | Actor Port | 2 |
| | Actor State | 1 |
| | Padding | 3 |
| TLV Type (Partner Information) = 0x02 | | 1 |
| TLV Length = 20 | | 1 |
| TLV Data | Partner System Priority | 2 |
| | Partner System ID | 6 |
| | Partner Key | 2 |
| | Partner Port Priority | 2 |
| | Partner Port | 2 |
| | Partner State | 1 |
| | Padding | 3 |
| TLV Type (Partner Information) = 0x03 | | 1 |
| TLV Length = 16 | | 1 |
| TLV Data | Collector Max Delay | 2 |
| | Padding | 12 |
| TLV Type (Terminator) = 0x00 | | 1 |
| TLV Length = 0 | | 1 |
| Padding | | 50 |

FIG. 4

Prior Art

500

| Description | | Length (in bytes) |
|---|---|---|
| LACP Version = 0xf1 | | 1 |
| TLV Type (Actor Information) = 0x01 | | 1 |
| TLV Length = 20 | | 1 |
| TLV Data | Actor System Priority | 2 |
| | Actor System ID | 6 |
| | Actor Key | 2 |
| | Actor Port Priority | 2 |
| | Actor Port | 2 |
| | Actor State | 1 |
| | Padding | 3 |
| TLV Type (Partner Information) = 0x02 | | 1 |
| TLV Length = 20 | | 1 |
| TLV Data | Partner System Priority | 2 |
| | Partner System ID | 6 |
| | Partner Key | 2 |
| | Partner Port Priority | 2 |
| | Partner Port | 2 |
| | Partner State | 1 |
| | Padding | 3 |
| TLV Type (Collector Information) = 0x03 | | 1 |
| TLV Length = 16 | | 1 |
| TLV Data | Collector Max Delay | 2 |
| | Padding | 12 |
| TLV Type (Actor Retry Count)=0x80 | | 1 |
| TVL Length = 4 | | 1 |
| TVL Data | Actor Retry Count | 1 |
| | Padding | 1 |
| TLV Type (Partner Retry Count)=0x81 | | 1 |
| TVL Length = 4 | | 1 |
| TVL Data | Partner Retry Count | 1 |
| | Padding | 1 |
| TLV Type (Terminator) = 0x00 | | 1 |
| TLV Length = 0 | | 1 |
| Padding | | 42 |

Labels: 502, 520, 524, 512, 508a, 508b, 516

SYSTEM AND METHOD FOR REDUCING PERMITTED SESSION DOWNTIME

RELATED APPLICATION(S)

This application claims the benefit of U.S. Provisional Application No. 63/575,322 filed on 5 Apr. 2024, the contents of which are incorporated herein by reference.

BACKGROUND

A T0 device, in the context of networking and data centers, typically refers to a type of top-of-rack (ToR) switch. These switches are crucial components in a data center's network architecture, serving as the first point of aggregation for servers within a rack. T0 devices connect directly to the servers and provide high-speed connectivity for intra-rack communication. They also facilitate efficient routing and switching of data packets to other network devices, ensuring smooth data flow within the data center. Currently for T0 devices such as devices operating according to certain operating systems, devices can have a maximum control plane downtime of, for example, 90 seconds before data traffic gets potentially dropped. This example 90-second limit results from the limits of the Link Aggregation Control Protocol (LACP) protocol, used for the uplinks to T1 devices. The LACP protocol allows for a maximum of 30 seconds between Link Aggregation Control Protocol Data Units (LACPDUs) and 3 retries (if this initial 30-second timer is missed), resulting in a total of 90 seconds, before the peer side considers the associated link aggregation group (LAG) to be down, and stops sending/receiving traffic on that LAG.

However, in certain instances for some T0 devices, the control plane downtime during an In-Service Software Upgrade (ISSU), also referred to as a "warm reboot," can approach 90 seconds or more. This is due to a combination of hardware limitations on the T0 device and the operating system image having more features compared to previous images. This increases the risk of data traffic getting dropped if an ISSU exceeds 90 seconds.

BRIEF DESCRIPTION OF THE DRAWINGS

FIG. 4 is a table including fields of a LAPDCU packet;

FIG. 5 is a is a table including fields of a LAPDCU packet that have been modified in accordance with embodiments of the disclosure;

Like reference symbols in the various drawings indicate like elements.

DETAILED DESCRIPTION

Figure 1:
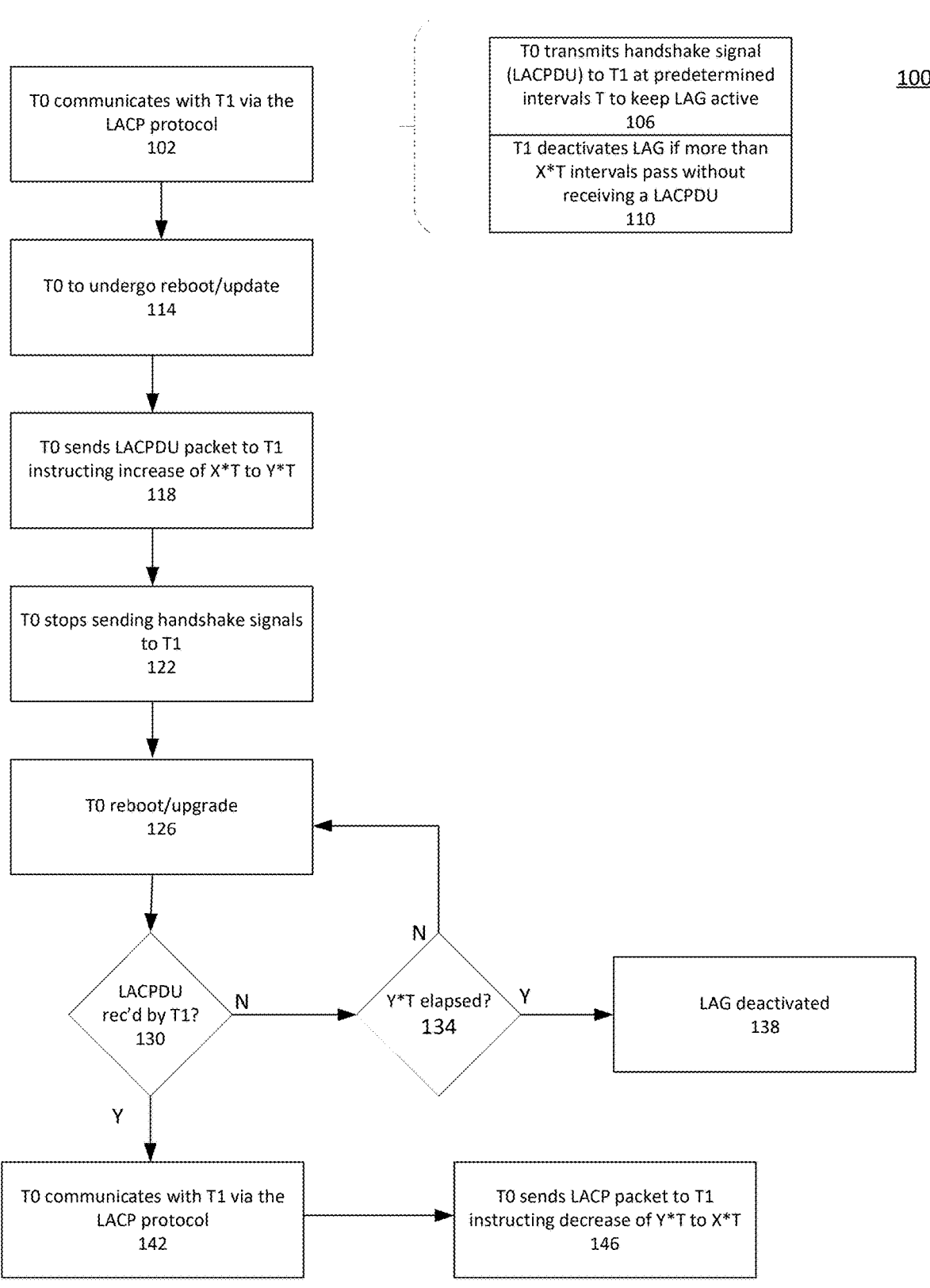
FIG. 1 is a flow diagram of a process for increasing permitted session downtime in accordance with embodiments of the disclosure.

Link Aggregation Control Protocol (LACP) is a networking protocol used to dynamically negotiate and manage the formation of link aggregation groups (LAGs) between network devices, such as switches or routers. LACP operates at the data link layer (Layer 2) of the Open Systems Interconnection (OSI) model and is defined by the IEEE 802.3ad standard. LACP allows network devices to automatically detect and configure link aggregation without manual intervention, enhancing network performance, bandwidth, and fault tolerance. It facilitates the bundling of multiple physical Ethernet links into a single logical link, enabling increased throughput and redundancy while simplifying network configuration and management.

During the LACP negotiation process, network devices exchange LACP packets to negotiate the parameters of the LAG, such as the number of links to aggregate, the speed and duplex settings, and the mode of operation (e.g., static or dynamic). LACP also monitors the status and health of the individual links in the aggregation group, allowing for dynamic adjustment and load balancing based on the current network conditions.

By leveraging LACP, network administrators can optimize network utilization, improve resilience against link failures, and simplify the management of complex network topologies. LACP is widely used in enterprise networks, data centers, and telecommunications environments to enhance the scalability, reliability, and performance of Ethernet networks.

Increasing Permitted Session Downtime

Embodiments of the disclosure are directed to manipulating permitted-session-downtime through negotiations between two network devices. In one embodiment of the disclosure, the process provides a way for an increased permitted-session-downtime for LACP, from the standard 90 s mentioned above to a higher value (for example, 150 s) which is programmable to suit developer requirements.

As described in further detail below, this is achieved by:

1. Modifying standard Link Aggregation Control Protocol Data Unit messages (known as LACPDU, described below) that are exchanged between two participating network devices (e.g., T0, T1) as part of the LACP.

2. According to LACP, the LACPDUs are sent from T0 to T1 every 30 seconds and, if 3 LACPDUs are not received consecutively by T1, the LACP session between the two devices is terminated.

3. Embodiments of the disclosure include a method and system by which two devices (e.g., T0, T1) exchange messages to negotiate an increased permitted session downtime.

4. In this system and method, the number of consecutively-missed LACPDUs that are allowed before the communication session is ended is increased from the standard 3 to, for example, 5.

5. Hence, the previously-allowed permitted session downtime of 90 s (30 s*3 LACPDU tries) is increased to 150 s (30 s*5 LACPDU tries).

6. When this new mechanism is enabled during a T0 (TOR) switch upgrade, LACP session downtime of greater than 90 s (but less than 150 s) does NOT cause any customer impact, since, in the current session, T1 is allowed to wait for up to 150 s for receipt of the LACPDU before the session is terminated.

According to embodiments of the disclosure, the LACP protocol is modified to increase the standard 90-second limit of permitted session downtime. This is done within the protocol by increasing the number of retries that are allowed by the peer side (this is calculated as a 30-second timer to receive a LACPDU, with 3 retries, giving a total of 90 seconds). By modifying this protocol to have the new requested retry count be sent by each side, this can be increased to a 150-second limit or higher. This new retry count can be valid until either:

a. a new retry count is sent by the peer device, or b. expiration of a set time interval, e.g., a duration of, for example, X minutes*retry count expires, after which time the LACP standard of 3 retries is reset, or c. the LACP session goes down with the new retry count (either because of the timer expiring or the link going down), or d. the peer device sends a LACPDU without the retry count TLVs (Type-Length-Value, described below), in which case the LACP standard of 3 retries applies.

A Type-Length-Value (TLV) structure is a method used in networking protocols to encode optional information in a flexible and extensible format. This structure is composed of three fields: the type, the length, and the value. The "type" field specifies the kind of information being encoded, identifying the nature of the data. The "length" field indicates the size of the value field, allowing the system to understand how many bytes to read. Finally, the "value" field contains the actual data or payload associated with the type.

The above instances are discussed in greater detail below.

A Link Aggregation Control Protocol Data Unit (LACPDU) is a type of frame used in Ethernet networks to facilitate the negotiation and management of link aggregation, also known as port trunking or bonding. Link aggregation combines multiple physical Ethernet links between two devices into a single logical link, increasing bandwidth, redundancy, and fault tolerance. LACPDU frames are exchanged between switches or other network devices to negotiate the parameters of the link aggregation group (LAG) and ensure that both ends of the link are configured in a compatible manner. These parameters include the number of links to aggregate, the speed and duplex settings, and the mode of operation (e.g., static or dynamic). LACPDU frames also contain information about the status and health of the individual links in the aggregation group, allowing for dynamic adjustment and load balancing based on the current network conditions.

The exchange of LACPDU frames is governed by the Link Aggregation Control Protocol (LACP), which is defined by the IEEE 802.3ad standard. LACP enables devices to dynamically establish and maintain link aggregation groups, ensuring optimal utilization of network resources and providing resilience against link failures. By exchanging LACPDU frames, network switches can automatically detect and configure link aggregation without requiring manual intervention, simplifying the management and configuration of high-performance Ethernet networks.

Figure 2:
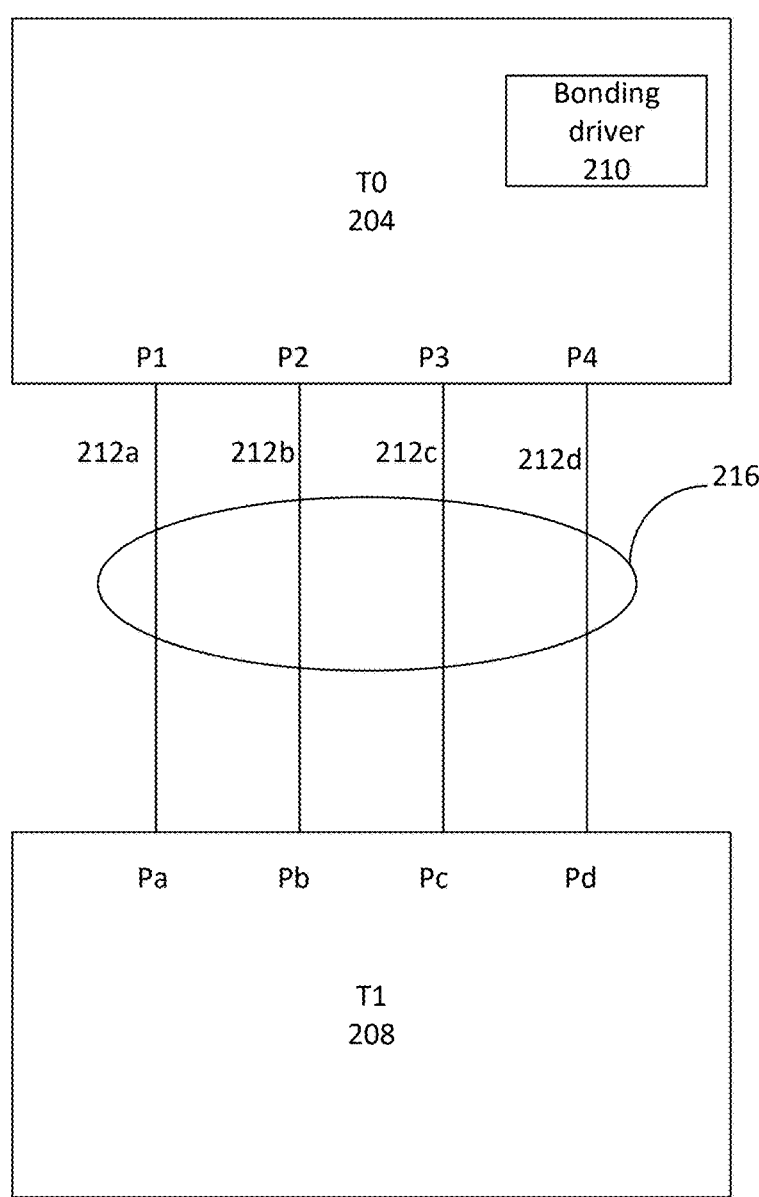
FIG. 2 is a block diagram of a T0/T1 communication system.

Referring to FIG. 1, a flowchart 100 depicts a process for increasing permitted downtime according to an embodiment of the disclosure. FIG. 2 is a block diagram showing a connection protocol between a T0 device 204 and a T1 device 208. As shown, To 204 includes ports P1, P2, P3, and T1 includes ports Pa, Pb, Pc, and Pd. Connection links 212*a*, 212*b*, 212*c*, and 212*d* form a LAG 216 connecting To 204 to T1 208. During normal operation, device T0 device 204 communicates with device T1 device 208 via LAG 216 according to a communication protocol, such as LACP, 102. In an embodiment, T0 may be a top-of-rack (TOR) switch. A TOR switch is a network switch commonly used in data centers to interconnect servers within a single rack or cabinet. As the name suggests, the TOR switch is typically located at the top of the server rack, providing a centralized point for connecting multiple servers and managing network traffic. Each server in the rack is typically connected to the TOR switch via an Ethernet cable, forming a local area network (LAN) within the rack. TOR switches provide high-speed connectivity and efficient traffic management between servers, as well as facilitating communication with the wider data center network and external networks. They are often designed with features such as high port density, low latency, and high bandwidth to meet the demands of modern data center environments. In addition to interconnecting servers within the same rack, TOR switches may also serve as aggregation points for traffic from multiple racks, connecting to distribution switches or spine switches in larger network architectures. This hierarchical network design helps improve scalability, flexibility, and manageability in large-scale data center deployments.

T0 device 204 includes a bonding driver 210, which is a software component that enables the aggregation of multiple network interfaces into a single logical interface. This aggregation provides several benefits, including increased bandwidth, redundancy, and load balancing. By combining multiple physical network interfaces, the bonding driver can distribute network traffic across all available interfaces, thereby enhancing overall network throughput. In the event that one of the physical interfaces fails, the bonded interface can continue to operate using the remaining active interfaces, ensuring uninterrupted network connectivity and improving fault tolerance. The bonding driver 210 operates at the kernel level, managing the coordination of data packets between the bonded interface and the underlying physical interfaces. It supports various bonding modes, each tailored to specific use cases and performance requirements. Common modes include round-robin, which distributes packets sequentially across interfaces; active-backup, where one interface is active and the others are on standby; and LACP to dynamically manage link aggregation.

As part of the LACP protocol, T0 device 204 transmits a handshake signal, or LACPDU, to T1 device 208 at predetermined time intervals T to keep the LAG 216 activated, 106. According to the LACP protocol, the standard time interval T is 30 seconds. T1 device 208 will deactivate the LAG 216 if it does not receive a number X of consecutive LACPDUs. Again, according to the LACP protocol, the default value of X is 3. According to the default values, if more than X*T intervals pass without T1 device 208 receiving a LACPDU, indicating that more than 90 seconds have elapsed (3*30 s), T1 208 deactivates the LAG 216, 110. Periodically, as part of regular maintenance, the T0 device 204 will need to undergo an upgrade and reboot operation. This is achieved using a procedure commonly known as In-Service Software Upgrade (ISSU), which is done with the purpose of minimizing impact to the operation of the communication device within which the T0 and T1 devices are operating. An ISSU is a process used in networking and telecommunications systems to update or upgrade the software running on a device without interrupting its normal operation or causing downtime. This capability is particularly critical in environments where continuous service availability is essential, such as data centers, telecommunications networks, and enterprise networks.

In general, during an ISSU, the software on a network device, such as a router, switch, or firewall, is upgraded while the device continues to handle traffic and maintain connectivity. This is achieved by carefully orchestrating the upgrade process to minimize disruption to ongoing operations. Typically, an ISSU involves transferring control of traffic handling and management functions between different software versions or instances running on the device, ensuring that there is no impact on the forwarding of data packets or the operation of network services.

ISSU mechanisms may vary depending on the specific hardware and software architecture of the network device. In some cases, redundant hardware components or software instances may be used to perform a seamless switchover between different software versions. Alternatively, advanced software features such as graceful restart, hitless forwarding, or stateful failover may be employed to maintain uninterrupted service during the upgrade process. The ability to perform In-Service Software Upgrades is crucial for minimizing service disruptions, avoiding downtime, and ensuring business continuity in networked environments where even brief interruptions can have significant consequences. By enabling entities to upgrade their network infrastructure without impacting ongoing operations, an ISSU helps maintain high levels of service availability, reliability, and performance in modern networking environments.

In the context of a top-of-rack (ToR) switch, an ISSU refers to the process of updating or upgrading the software running on the T0 device 204 without causing disruption to the network connectivity or data traffic. Top-of-rack switches are critical components in data center networking, providing connectivity for servers within a single rack or cabinet. As such, maintaining uninterrupted service is paramount, and any downtime or disruption can have significant impacts on data center operations.

During an ISSU for a TOR switch, such as T0 204, the switch's software is upgraded while it continues to handle network traffic and maintain connectivity for the servers connected to it. This process is carefully orchestrated to ensure that there is no loss of network connectivity or interruption to data transmission. It may involve redundant hardware components or software instances to ensure continuous operation during the upgrade process. Additionally, advanced software features such as hitless forwarding or stateful failover mechanisms may be utilized to seamlessly transition between different software versions without impacting network performance.

The ability to perform ISSU in a TOR switch is essential for networks to be kept up-to-date with the latest features, bug fixes, and security patches while minimizing the risk of downtime. By allowing upgrades to be performed without disrupting network operations, ISSU helps ensure high levels of availability, reliability, and performance in data center environments.

As part of the ISSU, when T0 204 reboots, there is a pre-defined amount of time periods T before which T0 device 204 needs to come back up online. This pre-defined expected time for a device to return back online is called permitted-session-downtime.

When T0 device 204 is to undergo the upgrade/reboot, 114, it will stop sending LACPDUs to T1 at the regular intervals, since it will be offline. Therefore, prior to the reboot, T0 device 204 sends a modified LACPDU packet to T1 device 208 in which the default number of retries, X (3 in this default instance) is increased to Y, 118, after which, T0 device 204 stops sending the handshake signals to T1 device 208, 122. In an embodiment of the disclosure, the value of Y is 5. In other words, the length of time of the permitted session downtime is increased from 90 seconds (X*T or 3*30 s) to 150 seconds (Y*T or 5*30 s).

As the reboot is taking place, 126, T1 device 208 monitors whether it has received the expected number of consecutive LACPDUs, 130. If not, T1 device 208 determines whether Y*T (5*30 s) has elapsed, 134. If not, while T0 device 204 is undergoing the upgrade/reboot, 126, T1 device 208 continues to monitor receipt of LACPDUs, 130. If, at 134, the permitted session downtime of Y*T has expired, the LAG 216 over which T0 device 204 and T1 device 208 are communicating is deactivated, 138. If, at 130, T1 device 208 receives an LACPDU, indicating that the upgrade/reboot of T0 device 204 is complete, T0 device 204 and T1 device 208 continue to communicate according to the LACP protocol, 142. In an embodiment, T0 device 204 can send a modified LACPDU packet to T1 device 208 to instruct a decrease of the retry count back to X*T (3*30 s), 146.

Figure 3:
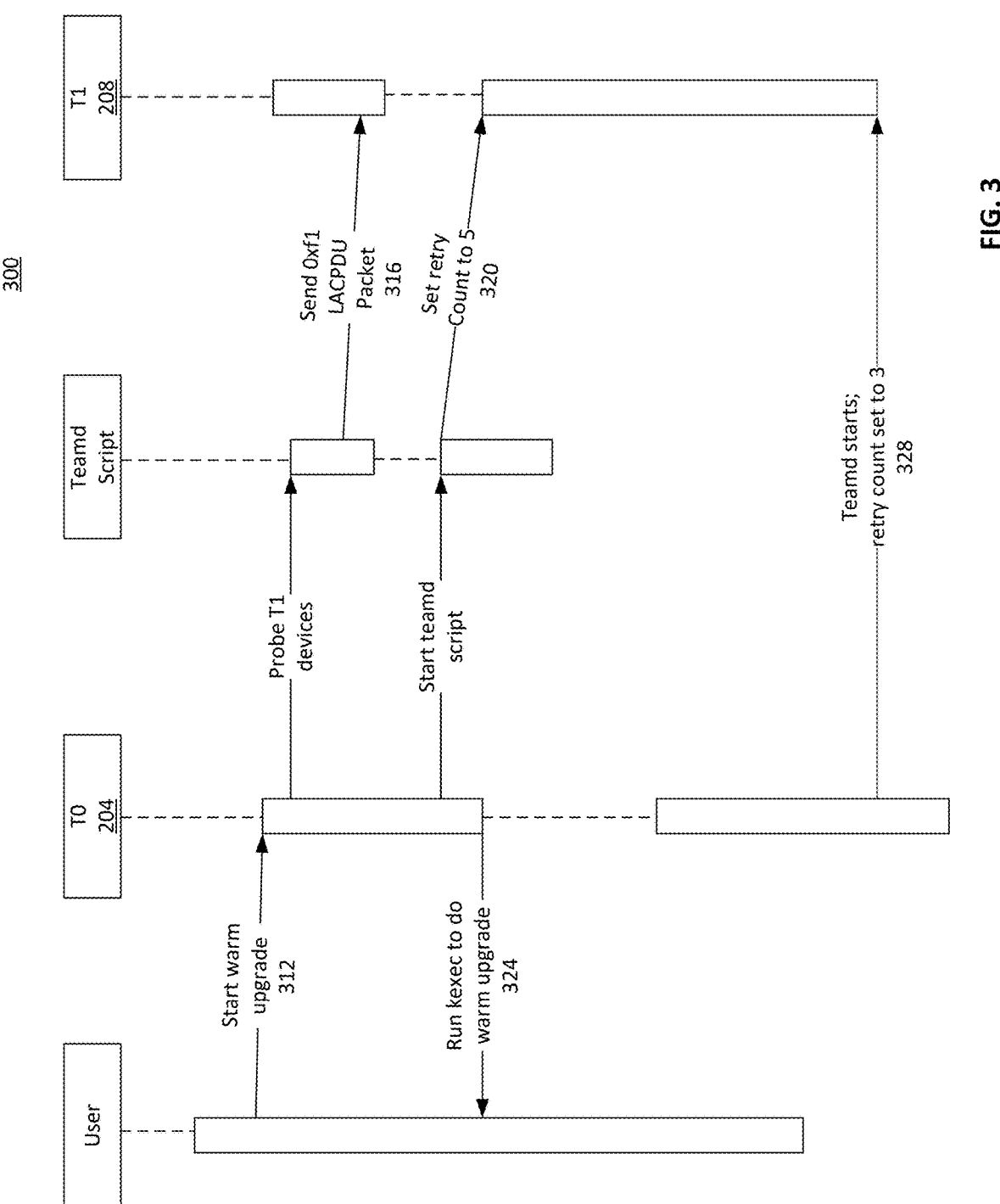
FIG. 3 is a communication diagram a process for increasing permitted session downtime in accordance with embodiments of the disclosure.

FIG. 3 depicts a flow 300 of the communication between T0 device 204 and T1 device 208 to effect the operation shown in flowchart 100. As the reboot begins, 312, T0 device 204 sends a LACPDU to T1 device 208, 316, to indicate a change of the version of LACP to permit the signal exchange that will follow. T0 device 204 also sends a modified LACPDU to T1 device 208 instructing that the retry count Y be set to 5, 320. Once the reboot is complete, 324, T0 device 204 sends a modified LACPDU to T1 device 208 instructing that the retry count be set back to 3, 328.

FIG. 4 is a table 400 showing the prior art LACPDU packet structure, which identifies each of the fields that make up a standard LACPDU. FIG. 5 is a table 500 showing changes made in the modified LACPDU of embodiments of the disclosure to effectuate the process described with reference to the flowchart 100 of FIG. 1. As shown in FIG. 5 and described below, the fields that are modified include the LACP Version field 502 and the fields 508a and 508b directed to the value of the retry count. In other words, fields 508a and 508b are used to increase the retry count from X to Y during the reboot/upgrade and then to decrease the retry count from Y to X once the reboot/upgrade is complete.

To manipulate the permitted session downtime in accordance with embodiments of the disclosure, the following changes are made to the LACPDU represented in FIG. 4 compared to the LACPDU represented in FIG. 3.

1. The LACP version field 502 is changed from 0x01 (FIG. 4) to 0xf1 to specify the LACP version that provides support for specific additional TLVs. Version 0xf1 provides support for specific additional TLVs, while LACP version 0x01 does not.
2. After the collector information Type-Length-Value (TLV) 512, add a TLV 508a with type 0x80 (Actor Retry Count), length of 4 bytes, followed by a 1-byte unsigned integer of the new retry count and a 1-byte padding.
3. Add an additional TLV 508b with type 0x81 (Partner Retry Count), length of 4 bytes, followed by a 1-byte unsigned integer of the new retry count and a 1-byte padding.
4. Ensure 8 fewer padding bytes 516 at the end of the packet (compared to the packet of the table in FIG. 3), to keep the packet size the same.

Here, the Actor Retry Count 508a and the Partner Retry Count 508b are specified in separate TLVs. This is so that each side can have their own retry count specified, and so that it is clear which side of the LAG session is requesting the higher retry count. This is also mirroring the Actor Information TLV 520 and Partner Information TLV 524, for the retry count.

By default, the current LACPDU packet structure (LACP version 1) may be used. When a custom retry count (specifically, a retry count other than 3) is either configured via command line interface (CLI) or received from the neighbor device, the new LACPDU packet structure (version 0xf1) will be used instead. When the retry count is changed back to 3 on both sides, then T0 device 204 will switch back to using version 1 (0x01), to remain compliant to the default LACP standard.

In embodiments of the disclosure, as specified above, for an ISSU, or warm reboot upgrade of T0 device 204, a retry count of 5 (maximum of 150 seconds) is specified. While a retry count of 5 has been found sufficient to support ISSUs in current devices, it will be understood that a greater number of retries can be specified as longer downtime sessions are indicated. The CLI that will be added for changing the retry count will support any number from 3 (the default) up to, for example, 10 or higher.

These steps assume that the device being upgraded is a T0 device, connected to multiple T1 neighbor devices. The steps specified in this embodiment of the disclosure are performed by the T0 device 204 without requiring action on the part of the T1 device 208.

Reducing Permitted Session Downtime

Figure 6:
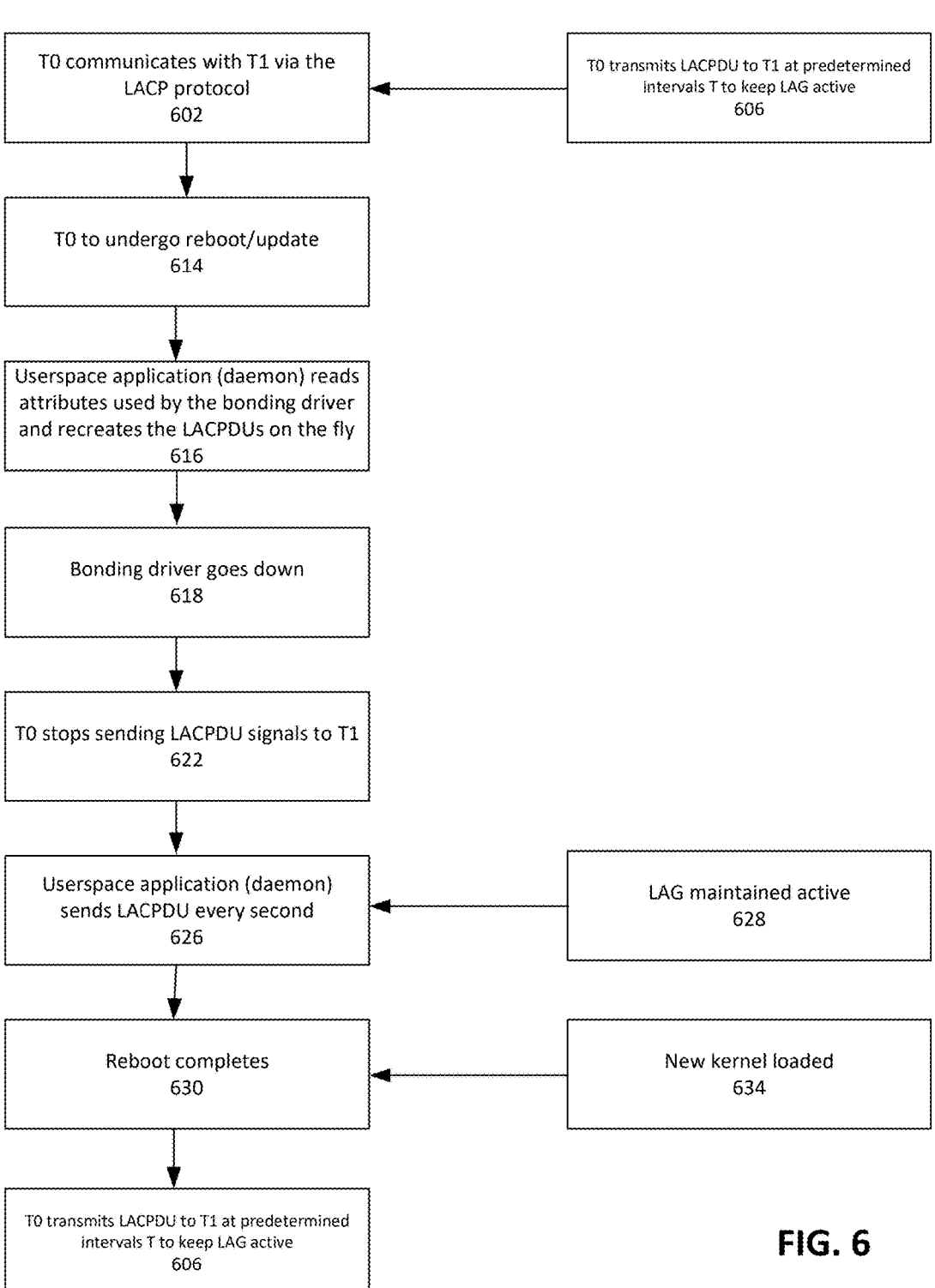
FIG. 6 is a flow diagram of a process for reducing permitted session downtime in accordance with another embodiment of the disclosure.

FIG. 6 is a flow diagram 600 of an embodiment of the disclosure in which a permitted session downtime is reduced to minimize user impact. During normal operation, T0 device 204 communicates with T1 device 208 via LAG 216 according to a communication protocol, such as LACP, 602. As part of the LACP protocol, T0 device 204 transmits a handshake signal, or LACPDU, to T1 device 208 at predetermined time intervals T to keep the LAG 216 activated, 606. According to the LACP protocol, the standard time interval T is 30 seconds. When T0 device 204 is set to undergo a reboot/upgrade 614, the associated bonding driver 210 goes down, 618, and T0 device 204 stops sending LACPDUs to T1 device 208, 622. Prior to the bonding driver 210 going down, a userspace application (daemon) reads attributes used by the bonding driver 210 to generate the LACPDUs and the daemon recreates the LACPDUs on-the-fly (e.g., in real time). While the bonding driver 210 is down, the daemon is activated to send LACPDUs every one second, 626, which maintains the LAG 216 in an active state, 628. When the reboot/upgrade is completed, 630, and the new kernel is loaded, 634, T0 device 204 takes over the transmission of LACPDUs, 606, to keep the LAG 216 activated.

This embodiment is directed to a process by which LACPDUs are self-generated (on-the-fly) by a userspace application. These self-generated LACPDUs are then sent repeatedly, for example, every is (instead of 30 s). However, this interval value is configurable and can be set to any value less than the default interval value to reduce session downtime. During the time when the network device is upgrading or rebooting, since the frequency of sending LACPDUs is increased, the clock of LACP session downtime starts much later than the standard procedure where the LACPDU is transmitted only every 30 seconds. The LACPDUs are sent after the bonding driver 210 goes down as the userspace application keeps running and sends the LACPDUs via a socket that is different from standard socket used by the bonding driver 210. Since LACPDUs are sent every second, only the time between the when last LACPDU is sent in the current kernel and when the first LACPDU is sent in the new kernel is downtime for the control plane. However, since this downtime starts much later in the 30 s interval being monitored by T1 device 208, the actual downtime can be less than a single 30 s interval (if operating at the default interval value). When this new process is enabled during the T0 device 204 upgrade, LACP session downtime is reduced (by as much as, for example, 20 s) and reduces the possibility of any user impact.

Figure 7:
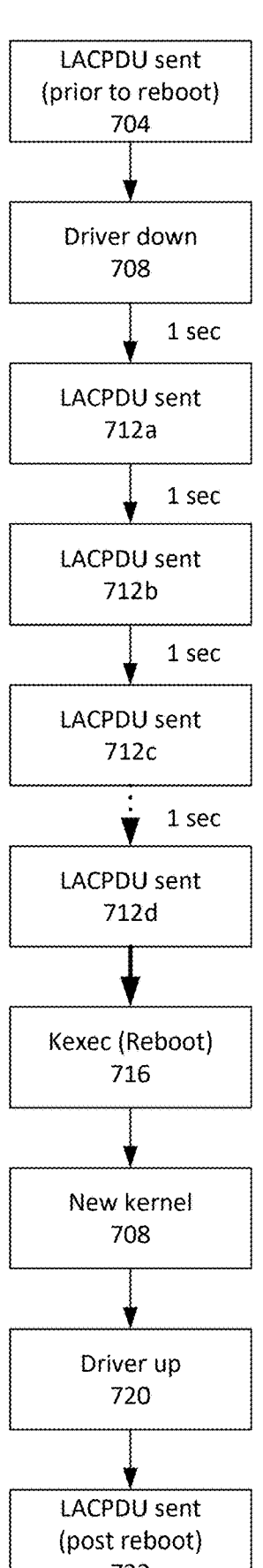
FIG. 7 is a flow diagram of the operation flow of the process for reducing permitted session downtime.

FIG. 7 is a flow diagram 700 further depicting an embodiment of the disclosure. Prior to the reboot operation, the final LACPDU is transmitted from T0 device 204 to T1 device 208, 704. When the reboot operation begins, the bonding driver 210 goes down, 708. The userspace application then begins sending LACPDUs 712*a*, 712*b*, 712*c* . . . 712*d* to T1 device 208. In this way, T1 device 208 receives no indication that T0 device is down. Since it is receiving LACPDUs more frequently than every 30 seconds, T1 device continues to operate normally as directed by the LACP. There is no handshake or negotiation between T0 device 204 and T1 device 208 or requirement for T1 device 208 to change its operation to accommodate the ISSU of T0 device 204.

While the userspace application is sending LACPDUs every second (in this example), the ISSU of T0 device 204 is allowed to take place without T1 device 208 triggering a teardown of LAG 216 after 90 seconds (30 s*3 tries) of not receiving a LACPDUAs long as T1 device 208 is receiving LACPDUs prior to the 30 second timeout, it will not cease LAG 216 and suspend operation. Once the ISSU of T0 device 204 is complete, 716, the new kernel is activated, 708, bonding driver 210 is brought back up, 720, and the next LACPDU is sent by T0 device 204 to T1 device 208 under normal operation, 722.

Accordingly, embodiments of the disclosure are directed to systems and methods for manipulating permitted session downtime to enable a T0 device to perform an ISSU without causing the LAG between it and a downstream T1 device to be terminated. In one embodiment, the T1 is instructed to allow for a greater number of missed consecutive LACPDUs to be tolerated before terminating the LAG. In another embodiment, LACPDUs are transmitted from a userspace application to the T1 device while the T0 device is undergoing an ISSU at a rate more frequently than the standard 30 seconds, to prevent the T1 device from terminating the LAG between it and the T0 device.

Figure 8:
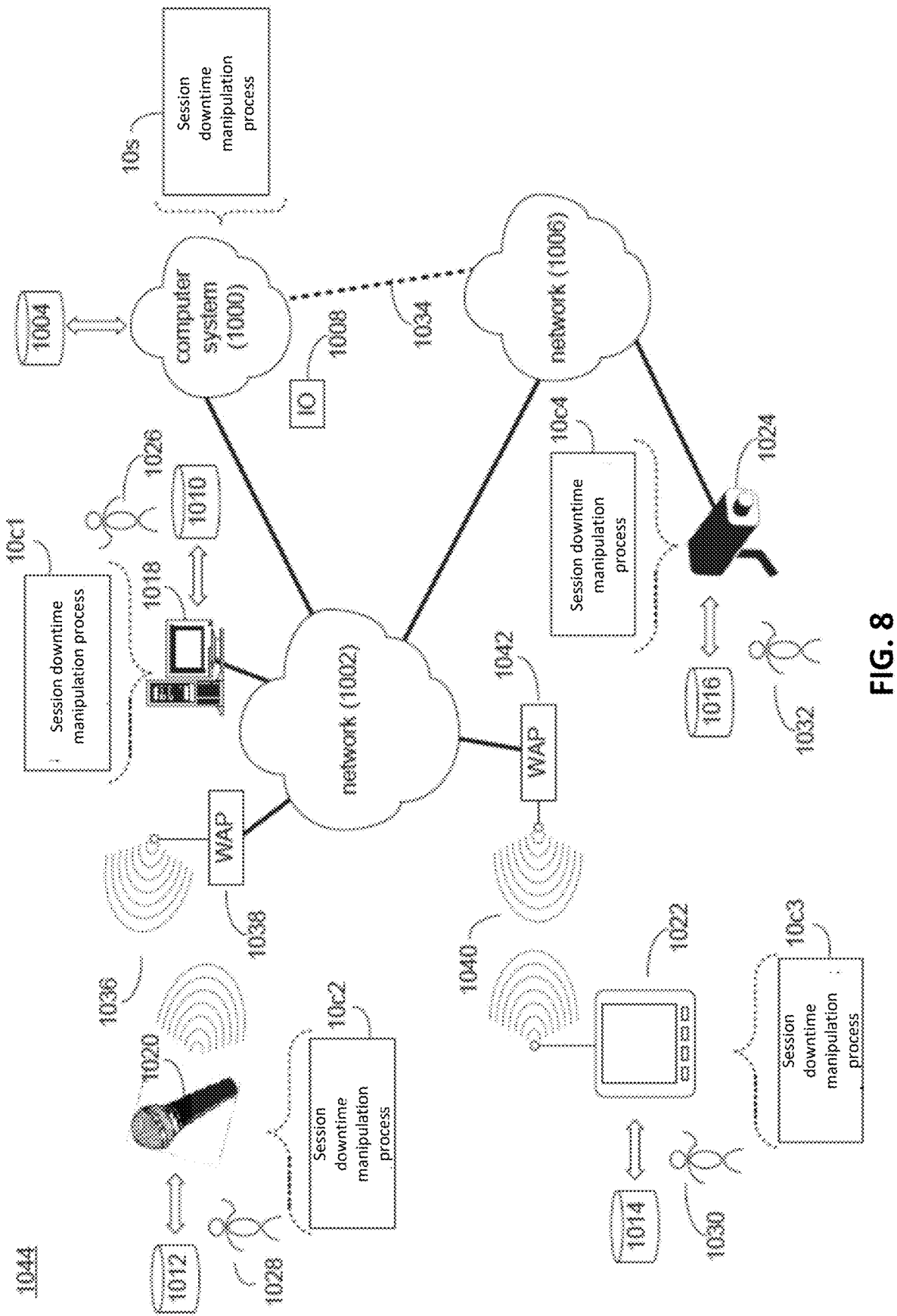
FIG. 8 is a diagrammatic view of a computer system and the operating system and session downtime manipulation process coupled to a distributed computing network.

System Overview:

Referring to FIG. 8, there is shown a session downtime manipulation process 1044. Session downtime manipulation process 1044 may be implemented as a server-side process, a client-side process, or a hybrid server-side/client-side process. For example, session downtime manipulation process 1044 may be implemented as a purely server-side process via session downtime manipulation process 10*s*. Alternatively, session downtime manipulation process 1044 may be implemented as a purely client-side process via one or more of session downtime manipulation process 10*cl*, session downtime manipulation process 10*c*2, session downtime manipulation process 10*c*3, and session downtime manipulation process 10*c*4. Alternatively still, session downtime manipulation process 1044 may be implemented as a hybrid server-side/client-side process via session downtime manipulation process 10*s* in combination with one or more of session downtime manipulation process 10*cl*, session downtime manipulation process 10*c*2, session downtime manipulation process 10*c*3, and session downtime manipulation process 10*c*4.

Accordingly, session downtime manipulation process 1044 as used in this disclosure may include any combination of session downtime manipulation process 1044, session downtime manipulation process 10*cl*, schema matching process, session downtime manipulation process 10*c*3, and session downtime manipulation process 10*c*4.

Session downtime manipulation process 10*s* may be a server application and may reside on and may be executed by a computer system 1000, which may be connected to network 1002 (e.g., the Internet or a local area network). Computer system 1000 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device and a NAS system. The various components of computer system 1000 may execute one or more operating systems.

The instruction sets and subroutines of computational cost reduction process 10*s*, which may be stored on storage device 1004 coupled to computer system 1000, may be executed by one or more processors (not shown) and one or more memory architectures (not shown) included within computer system 1000. Examples of storage device 1004 may include but are not limited to: a hard disk drive; a RAID device; a random-access memory (RAM); a read-only memory (ROM); and all forms of flash memory storage devices.

Network 1002 may be connected to one or more secondary networks (e.g., network 1004), examples of which may include but are not limited to: a local area network; a wide area network; or an intranet, for example.

Various IO requests (e.g., IO request 1008) may be sent from session downtime manipulation process 10*s*, session downtime manipulation process 10*c*1, session downtime manipulation process 10*c*2, session downtime manipulation process 10*c*3 and/or session downtime manipulation process 10*c*4 to computer system 1000. Examples of IO request 1008 may include but are not limited to data write requests (i.e., a request that content be written to computer system 1000) and data read requests (i.e., a request that content be read from computer system 1000).

The instruction sets and subroutines of session downtime manipulation process 10*c*1, session downtime manipulation process 10*c*2, session downtime manipulation process 10*c*3 and/or session downtime manipulation process 10*c*4, which may be stored on storage devices 1010, 1012, 1014, 1016 (respectively) coupled to client electronic devices 1018, 1020, 1022, 1024 (respectively), may be executed by one or more processors (not shown) and one or more memory architectures (not shown) incorporated into client electronic devices 1018, 1020, 1022, 1024 (respectively). Storage devices 1010, 1012, 1014, 1016 may include but are not limited to: hard disk drives; optical drives; RAID devices; random access memories (RAM); read-only memories (ROM), and all forms of flash memory storage devices. Examples of client electronic devices 1018, 1020, 1022, 1024 may include, but are not limited to, personal computing device 1018 (e.g., a smart phone, a personal digital assistant, a laptop computer, a notebook computer, and a desktop computer), audio input device 1020 (e.g., a handheld microphone, a lapel microphone, an embedded microphone (such as those embedded within eyeglasses, smart phones, tablet computers and/or watches) and an audio recording device), display device 1022 (e.g., a tablet computer, a computer monitor, and a smart television), a hybrid device (e.g., a single device that includes the functionality of one or more of the above-references devices; not shown), an audio rendering device (e.g., a speaker system, a headphone system, or an earbud system; not shown), and a dedicated network device (not shown).

Users 1026, 1028, 1030, 1032 may access computer system 1000 directly through network 1002 or through secondary network 1006. Further, computer system 1000 may be connected to network 1002 through secondary network 1006, as illustrated with link line 1034.

The various client electronic devices (e.g., client electronic devices 1018, 1020, 1022, 1024) may be directly or indirectly coupled to network 1002 (or network 1006). For example, personal computing device 1018 is shown directly coupled to network 1002 via a hardwired network connection. Further, machine vision input device 1024 is shown directly coupled to network 1006 via a hardwired network connection. Audio input device 1022 is shown wirelessly coupled to network 1002 via wireless communication channel 1036 established between audio input device 1020 and wireless access point (i.e., WAP) 1038, which is shown directly coupled to network 1002. WAP 1038 may be, for example, an IEEE 802.11a, 802.11b, 802.11 g, 802.11n, Wi-Fi, and/or any device that is capable of establishing wireless communication channel 1036 between audio input device 1020 and WAP 1038. Display device 1022 is shown wirelessly coupled to network 1002 via wireless communication channel 1040 established between display device 1022 and WAP 1042, which is shown directly coupled to network 1002.

The various client electronic devices (e.g., client electronic devices 1018, 1020, 1022, 1024) may each execute an operating system, wherein the combination of the various client electronic devices (e.g., client electronic devices 1018, 1020, 1022, 1024) and computer system 1000 may form modular system 1044.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method, executed on a computing environment including a plurality of interconnected computing devices, comprising:

transmitting first signals at a predetermined time interval of X seconds;

upon initiation of a reboot operation of a first device associated with a processor, decreasing the predetermined time interval from X seconds to Y seconds;

transmitting second signals at the predetermined time interval of Y seconds;

once the reboot operation of the first device is complete, increasing the predetermined time interval from Y seconds to X seconds.

2. The method of claim 1 wherein transmitting the second signals at the predetermined time interval of Y seconds is performed by a second entity separate from a first entity.

3. The method of claim 2 wherein the first entity is a T0 device.

4. The method of claim 3 wherein the second entity is a userspace application.

5. The method of claim 4 wherein X is 30 seconds.

6. The method of claim 5 wherein Y is less than 30 seconds.

7. The method of claim 6 wherein the reboot operation is an in-service software upgrade (ISSU).

8. A computer program product residing on a non-transitory computer readable medium having a plurality of instructions stored thereon which, when executed by a processor, cause the processor to perform operations comprising:

transmitting first signals at a predetermined time interval of X seconds;

upon initiation of a reboot operation of a first device associated with the processor, decreasing the predetermined time interval from X seconds to Y seconds;

transmitting second signals at the predetermined time interval of Y seconds;

once the reboot operation of the first device is complete, increasing the predetermined time interval from Y seconds to X seconds.

9. The computer program product of claim 8 wherein transmitting the second signals at the predetermined time interval of Y seconds is performed by a second entity separate from a first entity.

10. The computer program product of claim 9 wherein the first entity is a T0 device.

11. The computer program product of claim 10 wherein the second entity is a userspace application.

12. The computer program product of claim 11 wherein X is 30 seconds.

13. The computer program product of claim 12 wherein Y is less than 30 seconds.

14. The computer program product of claim 13 wherein the reboot operation is an in-service software upgrade (ISSU).

15. A system comprising:

a memory;

a computing environment including a plurality of interconnected computing devices; and a processor to:

transmit first signals at a predetermined time interval of X seconds;

upon initiation of a reboot operation of a first device associated with the processor, decrease the predetermined time interval from X seconds to Y seconds;

transmit second signals at the predetermined time interval of Y seconds;

once the reboot operation of the first device is complete, increase the predetermined time interval from Y seconds to X seconds.

16. The system of claim 15 wherein transmitting the second signals at the predetermined time interval of Y seconds is performed by a second entity separate from a first entity.

17. The system of claim 16 wherein the first entity is a T0 device.

18. The system of claim 17 wherein the second entity is a userspace application.

19. The system of claim 17 wherein X is 30 seconds.

20. The system of claim 19 wherein Y is less than 30 seconds.

21. The system of claim 20 wherein the reboot operation is an in-service software upgrade (ISSU).

* * * * *